(12) United States Patent
Van Nieuwenhuyze

(10) Patent No.: US 8,819,449 B2
(45) Date of Patent: Aug. 26, 2014

(54) EVENT COUNTER IN A SYSTEM ADAPTED TO THE JAVACARD LANGUAGE

(75) Inventor: Olivier Van Nieuwenhuyze, Wezembeek-Oppem (BE)

(73) Assignee: Proton World International N.V., Zaventem (BE)

( * ) Notice: Subject to any disclaimer, the term of this patent is extended or adjusted under 35 U.S.C. 154(b) by 192 days.

(21) Appl. No.: 13/081,382

(22) Filed: Apr. 6, 2011

(65) Prior Publication Data

US 2011/0252222 A1    Oct. 13, 2011

(30) Foreign Application Priority Data

Apr. 7, 2010    (FR) ...................................... 10 52602

(51) Int. Cl.
| | | |
|---|---|---|
| G06F 11/00 | (2006.01) |
| G06F 21/52 | (2013.01) |
| G07F 7/10 | (2006.01) |
| G06F 9/32 | (2006.01) |
| G06F 21/77 | (2013.01) |
| G06F 21/71 | (2013.01) |
| G06Q 20/34 | (2012.01) |

(52) U.S. Cl.
CPC .......... *G06F 21/52* (2013.01); *G06F 2201/865* (2013.01); *G06F 2201/88* (2013.01); *G06F 21/77* (2013.01); *G07F 7/1008* (2013.01); *G06F 9/321* (2013.01); *G06F 2201/86* (2013.01); *G06F 21/71* (2013.01); *G06Q 20/3563* (2013.01)
USPC ............ 713/190; 714/47.1; 714/47.2; 714/51

(58) Field of Classification Search
CPC ................ G06F 11/00; G06F 11/075–11/076; G06F 11/3466; G06F 2201/86; G06F 2201/865; G06F 2201/88; G06F 9/321–9/328
USPC .......................... 713/190, 502; 717/158, 127; 714/47.1–47.3, 48–51
See application file for complete search history.

(56) References Cited

U.S. PATENT DOCUMENTS

| | | | | |
|---|---|---|---|---|
| 4,333,316 A * | 6/1982 | Stamp et al. ................. | 62/126 |
| 4,879,645 A * | 11/1989 | Tamada et al. ............... | 235/380 |
| 5,164,969 A * | 11/1992 | Alley et al. .................. | 377/39 |
| 7,168,065 B1 * | 1/2007 | Naccache et al. ............ | 717/127 |
| 8,321,868 B2 * | 11/2012 | Friess et al. ................. | 718/102 |
| 2003/0057272 A1 * | 3/2003 | Bidan et al. .................. | 235/380 |
| 2004/0194077 A1 * | 9/2004 | Bharadwaj et al. .......... | 717/158 |
| 2005/0022060 A1 * | 1/2005 | Hashimoto et al. ........... | 714/37 |
| 2005/0138639 A1 * | 6/2005 | Hagan .......................... | 719/318 |

OTHER PUBLICATIONS

French Search Report dated Oct. 15, 2010 from corresponding French Application No. 10/52602.

(Continued)

*Primary Examiner* — Christopher Revak
*Assistant Examiner* — Vadim Savenkov
(74) *Attorney, Agent, or Firm* — Wolf, Greenfield & Sacks, P.C.

(57) ABSTRACT

The implementation of a counter in a microcontroller adapted to the JavaCard language while respecting the atomicity of a modification of the value of this counter, wherein the counter is reset by the sending to the microcontroller of an instruction to verify a user code by submitting a correct code, and the value of the counter is decremented by the sending to the microcontroller of the instruction to verify the user code with an erroneous code value.

18 Claims, 5 Drawing Sheets

(56) References Cited

OTHER PUBLICATIONS

Folkman, L., *The Use of Power Analysis for Influencing PIN Verification on Cryptographic Smart Card*, Bachelor Thesis of Masaryk University—Faculty of Informatics, 2007, pp. 1-32, XP002605177.

Mostowski W.: *Formal Reasoning About Non-atomic Java Card Methods in Dynamic Logic*, FM 2006, LNCS 4085, 2006, pp. 444-459, XP002605178.

* cited by examiner

EVENT COUNTER IN A SYSTEM ADAPTED TO THE JAVACARD LANGUAGE

CROSS REFERENCE TO RELATED APPLICATIONS

This application claims the priority benefit of French patent application Ser. No. 10/52602, filed on Apr. 7, 2010, entitled "EVENT COUNTER IN A SYSTEM ADAPTED TO THE JAVACARD LANGUAGE," which is hereby incorporated by reference to the maximum extent allowable by law.

BACKGROUND OF THE INVENTION

1. Field of the Invention

The present invention generally relates to electronic circuits and, more specifically, to microcontrollers embedded in electronic devices. The present invention more specifically applies to microcontrollers supported by microcircuit cards or the like and capable of executing programs in the Java language adapted to microcircuit cards, currently called JavaCard language.

2. Discussion of the Related Art

More and more microcircuit cards, be they payment cards, subscriber identification modules (SIM), transport cards, etc. are capable of executing programs in the JavaCard language. It is generally spoken about Java applications (Applet) and of JavaCard Virtual Machines (JCVM).

Any microprocessor adapted to the JavaCard language, and more specifically any microcircuit card microcontroller adapted to such a language, should comply with certain constraints specific to the characteristics of the JavaCard program.

Among such constraints, any update of JavaCard data in a non-volatile memory (generally designated in Java language as a persistent memory) of the circuit must be atomic. In JavaCard, Java data generally correspond to 1 byte, a short word (2 bytes), or a data table. The atomicity of an instruction or transaction (instruction sequence) executed by a microcontroller means that one or several variables involved in this transaction do not risk being provided with any state in case the transaction is interrupted (for example, by loss of the circuit power supply). The simplest case is a variable having an initial state and a final state. The atomicity of a transaction implementing this variable then means that, even if the transaction is interrupted, the variable does not risk being provided at an intermediary state.

This constraint generally leads to deferring data update operations in the non-volatile memory to avoid as much as possible slowing down operations. Thus, the writing of data into the non-volatile memory only occurs at the end of a processing method.

A consequence of such a deferral in the recording in the non-volatile memory is that it is not possible to implement a secure counter. "Secure counter" is used to designate a counter indicating a value that can be considered as reliable regarding the operation or the transaction monitored by this counter. It may be desirable for such a counter to reliably count a number of executions of a JavaCard application, for example, to control the number of diffusions of a content in a toll broadcasting system, to decrement a number of uses of a transport ticket or access pass (cinema, for example), etc.

For such a counter to be reliable, it should be ascertained that a willful or incidental intervention on the card, for example, by interruption of its power supply, does not enable to prevent an update of the counter. To achieve this, the counter update should be atomic during the write operation. Now, in a JavaCard environment, it should be decided for all data updates to be atomic at the time when they are launched, which would considerably slow down the processing.

SUMMARY OF THE INVENTION

An object of an embodiment of the present invention is to provide a solution enabling to implement a secure counter in a JavaCard environment.

An object of another embodiment of the present invention is to provide a solution compatible with existing runtime environments, in particular with existing chip cards.

To achieve all or part of these and other objects, at least one embodiment of the present invention provides a method for implementing a counter in a microcontroller adapted to the JavaCard language while respecting the atomicity of a modification of the value of this counter, wherein:

the counter is reset by the sending to the microcontroller of an instruction to verify a user code by submitting a correct code; and the value of the counter is decremented by the sending to the microcontroller of said an instruction to verify the user code with an erroneous code value.

According to an embodiment of the present invention, the correct and erroneous values are stored in a non-volatile memory of the microcontroller.

An embodiment of the present invention also provides a method for counting the number of executions of a program written in JavaCard language implementing such a counter.

An embodiment of the present invention also provides a method for counting the number of uses of a JavaCard object implementing such a counter.

An embodiment of the present invention also provides a method for monitoring the flow of a section of a program, wherein:

a counter is decremented at least once at the beginning of the execution of the section;

the counter value is compared with a maximum reset value; and the counter is reset, at the end of the section, only in case of a correct execution.

An embodiment of the present invention also provides an electronic system capable of executing programs in JavaCard language, comprising at least one rewritable non-volatile memory and at least one volatile memory, wherein an update of a transaction counter is performed according to the above method.

The foregoing objects, features, and advantages of the present invention will be discussed in detail in the following non-limiting description of specific embodiments in connection with the accompanying drawings.

DETAILED DESCRIPTION

Figure 1:
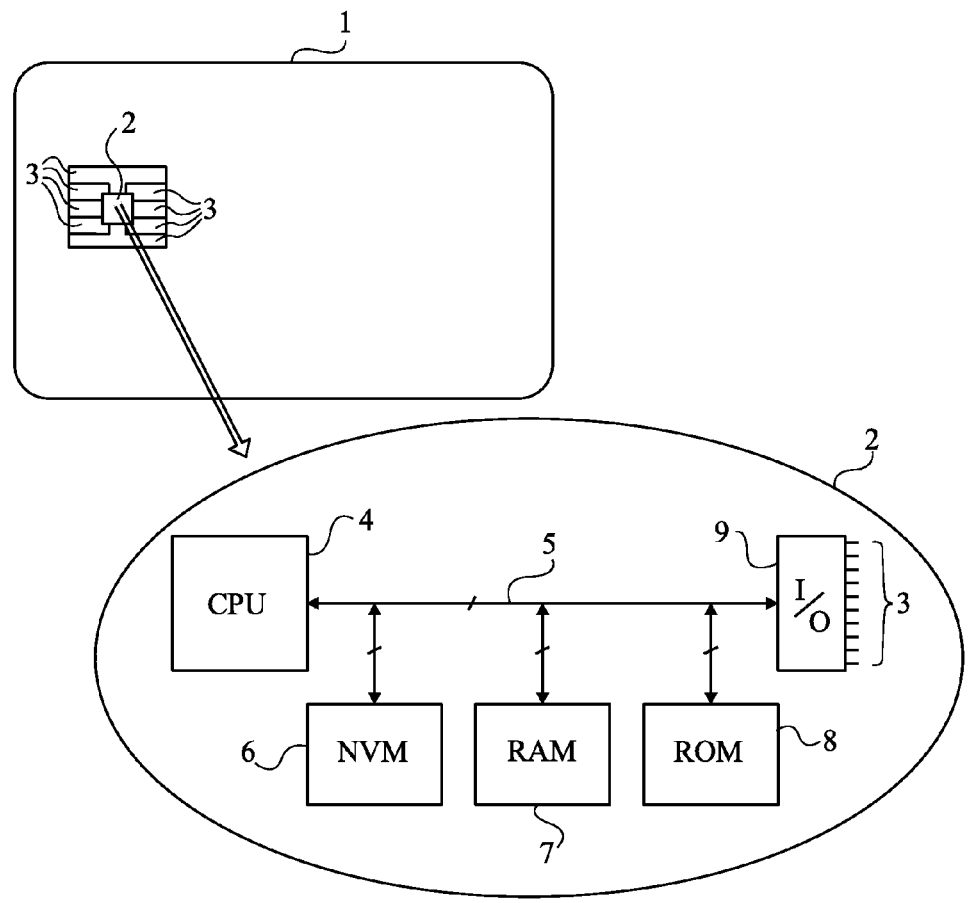
FIG. 1 very schematically shows an example of a microcontroller of a chip card to which the present invention applies.

The same elements have been designated with the same reference numerals in the different drawings. For clarity, only those steps and elements which are useful to the understanding of the present invention have been shown and will be described. In particular, the JavaCard applications to which the present invention applies have not been detailed, since the present invention does modify these applications. Further, the exchanges between the environment of the JavaCard application and the rest of the electronic circuit integrating the microprocessor have only been discussed for the needs of the present invention, the rest of the operation and the exchanges being unmodified.

Embodiment of the present invention will be described hereafter in relation with an example of application to a microcontroller chip card. It however more generally applies to any electronic circuit integrating a microprocessor and volatile and non-volatile internal memories, and which is capable of executing programs in JavaCard language.

FIG. 1 schematically shows a card 1 with a chip 2 of the type to which embodiments of the present invention apply. In the example of FIG. 1, the chip card is a contactless card 3. However, the presence or the absence of contacts by no means modifies what will be described. In the case of a contactless chip card, contact metal pads 3 are replaced or completed with an antenna of an oscillating circuit to communicate with a terminal emitting an electromagnetic field.

As illustrated in FIG. 1, a microcontroller chip 2 comprises a central processing unit 4 communicating, via one or several buses 5, with internal memories among which is, especially, a rewritable non-volatile memory 6 (NVM), for example of EEPROM type. Chip 2 also comprises a RAM 7 for executing current calculations and temporarily storing data, and a ROM 8 generally containing the programs executed by central processing unit 4. Finally, central unit 4 is also connected (in this example, by bus 5) to an input/output circuit 9 (I/O) which is further connected to contacts 3. In the case of a contactless chip (electromagnetic transponder), the input/output circuit modulates a carrier and is thus connected to an oscillating circuit forming an antenna.

Of course, the chip card (more generally, the electronic element comprising the embedded microcontroller) may comprise other components and circuits according to applications.

Figure 2:
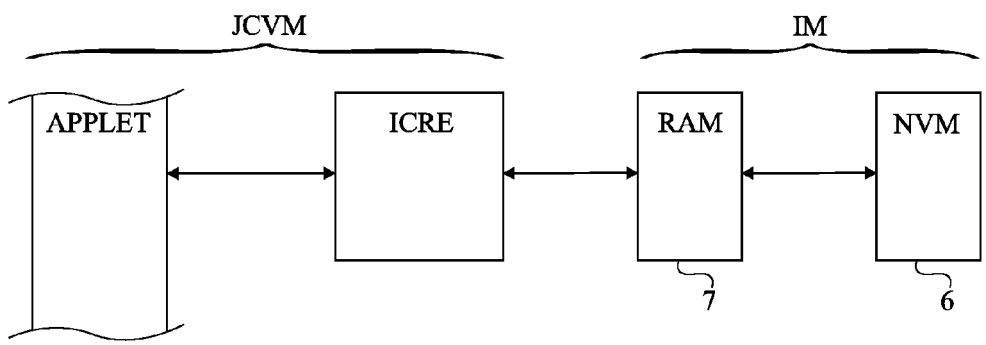
FIG. 2 illustrates in a block diagram the functions involved in the JavaCard application processing.

FIG. 2 schematically and functionally illustrates the elements involved in the execution of a JavaCard application (program in JavaCard language). Microprocessor 4 emulates a virtual machine (JCVM) which executes a JavaCard application (APPLET) by emulating a runtime environment adapted to the JavaCard language (JCRE—JavaCard Runtime Environment). The runtime environment is used as an intermediary between the instructions of the JavaCard application and the internal storage elements (IM—Internal Memory) of the circuit, among which volatile memory 7 or another register or temporary storage element, and rewritable non-volatile memory 6 (NVM). It provides the application programming interfaces (API) to the loaded applications.

Figure 3:
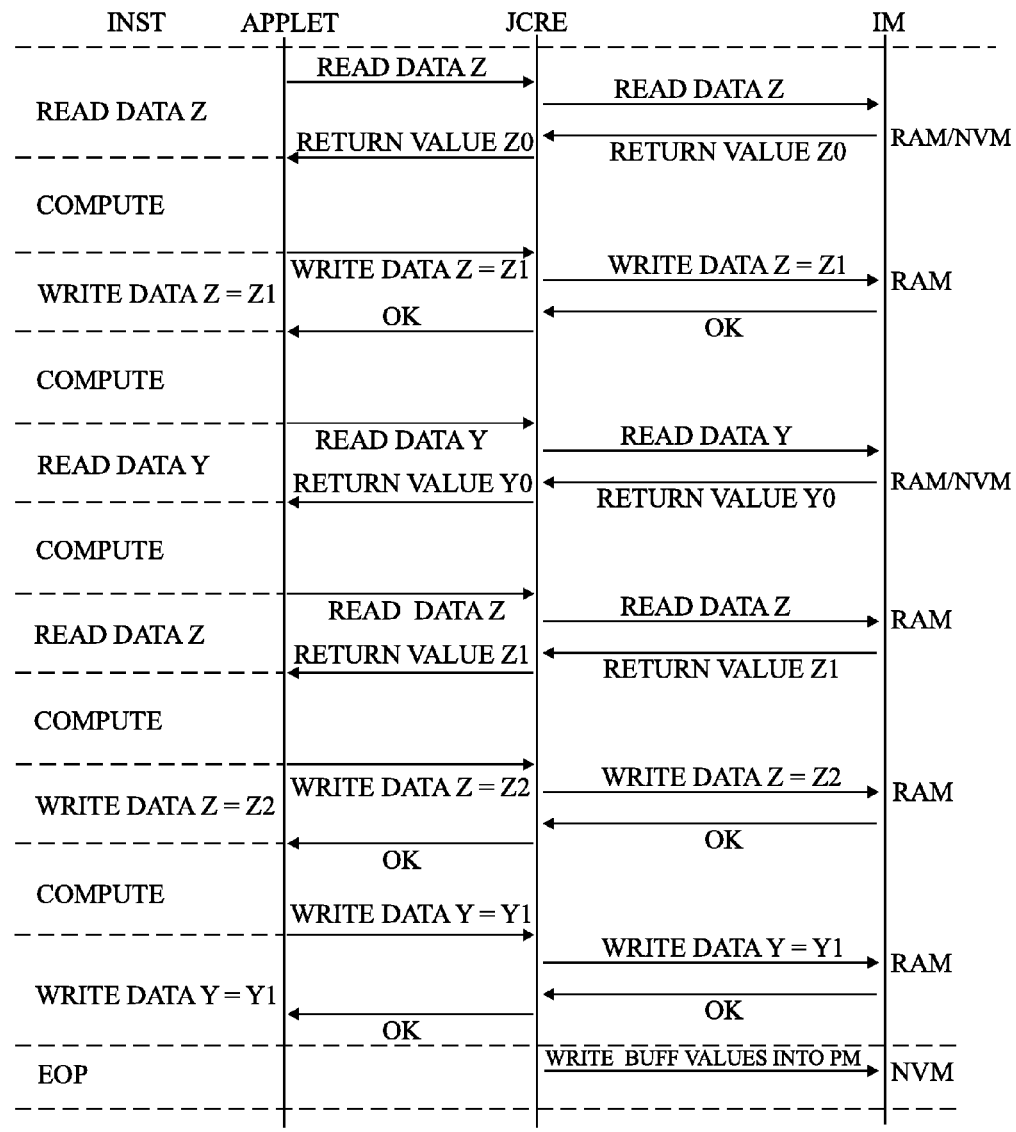
FIG. 3 very schematically illustrates the exchanges between a JavaCard application and a memory internal to the microcontroller.

FIG. 3 illustrates different exchanges during the execution of a JavaCard processing.

Successive operations (COMPUTE) manipulating data Z and Y stored in the non-volatile memory of the card are assumed. Such operations are thus punctuated by instructions for reading (READ DATA) or writing (WRITE DATA) the value of these data from or into the memory. On the JavaCard application (APPLET) side, the successive read, write, and data processing instructions INST are processed by runtime environment JCRE of the microprocessor, which manages the accesses to the internal memory, be it the temporary memory or the non-volatile memory.

A data read instruction READ DATA on the JavaCard application side causes the reading by the microcontroller of the data from internal memory IM of the circuit. This memory (RAM or NVM) returns the data value, respectively Z0, Z1, Y0 according to the location (NVM/RAM) where the data are stored. This value is returned RETURN VALUE by the microcontroller environment to the JavaCard application. A writing of a data value WRITE DATA comprises, under control of the runtime environment, causing the writing of the value, for example, Z1, Y1, Z2, into the RAM, followed by an execution response (OK) to the JavaCard application. Different computing phases (COMPUTE) may or not take place between the various read and write operations.

At the end of the processing (EOP), the runtime environment of the JavaCard application causes the writing, into the non-volatile memory (WRITE BUFF VALUES INTO PM), of the temporarily stored values.

The above discussion shows that in case the processing is interrupted before the end, the atomicity of the transaction is not respected. In the example of FIG. 3, an interrupt before the writing into the non-volatile may result in data Z having value Z0, Z1, or Z2 and data Y having value Y0 or Y1. Only after the writing into the non-volatile memory is the value of the data respectively set to Z2 and to Y1 in the example of FIG. 3.

Such a deferral of the recording in the non-volatile memory does not enable to implement a secure counter.

Figure 4A:
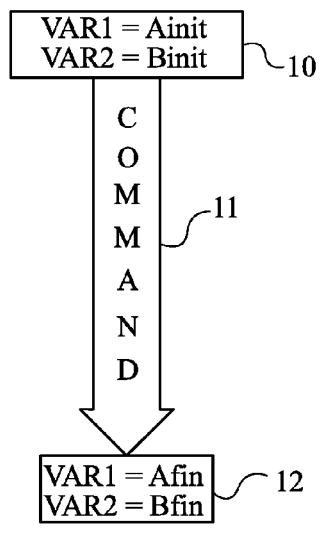
FIGS. 4A and 4B very schematically illustrate the atomicity of an instruction executed by a microcontroller.
Figure 4B:
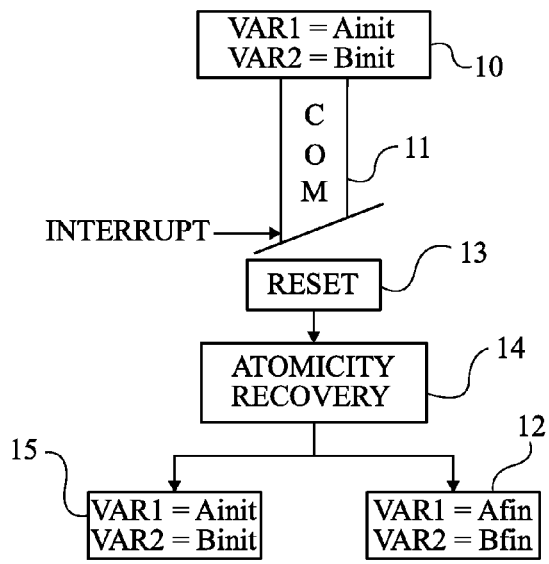

FIGS. 4A and 4B very schematically and generally illustrate the atomicity of an instruction executed by a microcontroller. FIG. 4A illustrates the progress of the instruction with no interrupt. FIG. 4B illustrates this progress in the presence of an interrupt. The interrupt generally is, in the case of a contact chip card, an outage of the microcontroller power supply. More generally, it may be any disturbance resulting in a malfunction of the microcontroller and causing its resetting.

In the example of FIG. 4A, an instruction involving two variables VAR1 and VAR2 respectively having initial states Ainit and Binit and having to take, at the end of the execution of the instruction, final states Afin and Bfin, is assumed. Variables VAR1 and VAR2 are stored in non-volatile memory 6. At the beginning of the execution of the instruction (block 10), variables VAR1 and VAR2 are in their respective initial states Ainit and Binit. Assuming that the instruction (block 11, COM) is executed normally, the non-volatile memory contains, at the end of the execution for variables VAR1 and VAR2, the respective final states thereof (block 12).

In the case (FIG. 4B) where an interrupt INTERRUPT occurs during the execution of instruction 11, for example, by outage of the chip card power supply, a specific procedure is then implemented. This procedure comprises, on reset (block 13, RESET) after powering the card back on, recovering the atomicity (block 14, ATOMICITY RECOVERY) of the transaction. This procedure leads in the present example to recovering, in the non-volatile memory, either the final states (block 12) of the variables, or their initial states (block 15).

In the above example, it is assumed that the transaction is considered as atomic provided that the update of variables A and B is performed for both variables or not at all. Accordingly, an intermediary state in which a single one of the two variables is updated is considered as an invalid or unauthorized state. To respect the atomicity of the transaction, the states of the variables in the non-volatile memory and their combination should correspond to states considered as logically consistent. In case the transaction is interrupted, the processor should thus be able to restore one of the consistent states or combination.

It should be noted that in the example of a counter, a single variable (the counter value) is updated.

There are many techniques for recovering the transaction atomicity. For example, U.S. Pat. No. 6,535,997 describes a method for executing transactions between an external system and a chip card in which a procedure for recovering the transaction atomicity is implemented.

In a JavaCard environment, the atomicity of a data update may be configured. However, in this case, any data writing will have to be performed at once to respect this atomicity. Accordingly, this considerably slows down the execution of JavaCard applications, which is not desirable.

It could have been devised to create a specific JavaCard object, that is, a specific instruction sequence which would make the updating of a counter value atomic. However, such a solution requires modifying the characteristics of the existing JavaCard program and is incompatible with the stock of microcontrollers having a JavaCard application runtime environment.

Figure 5:
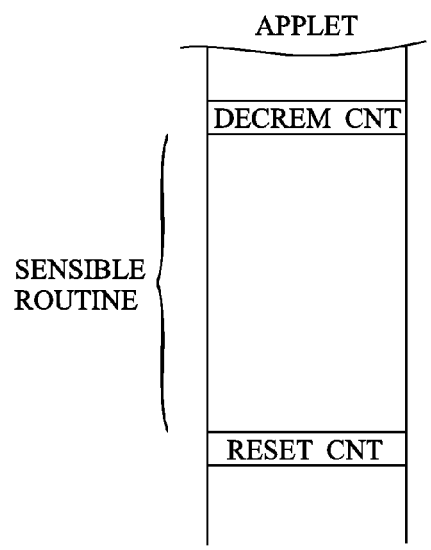
FIG. 5 very schematically illustrates a program section illustrating an embodiment of the present invention.

FIG. 5 is a simplified representation of a program in JavaCard language integrating a transaction or a process (SENSIBLE ROUTINE) having a number of occurrences which is desired to be verified by means of a counter. For this purpose, the decrementing of a counter (DECREMENT CNT) is provided at the beginning of the routine to be protected and a resetting of this counter is provided at the end of the routine. The reset replaces the counter value with a limiting value.

The role of the counter is to reliably count the number of executions of the specific function or transaction. The section of the program surrounded by the decrement and the reset of the counter depends on the program portion which is considered as sensitive in terms of number of executions. For example, the counter of FIG. 5 is used to detect whether program SENSIBLE ROUTINE undergoes fault injection attacks resulting in several executions without completing any. The counter is then decremented without being ever reset. This enables to detect that the authorized number of executions has been exceeded.

Figure 6:
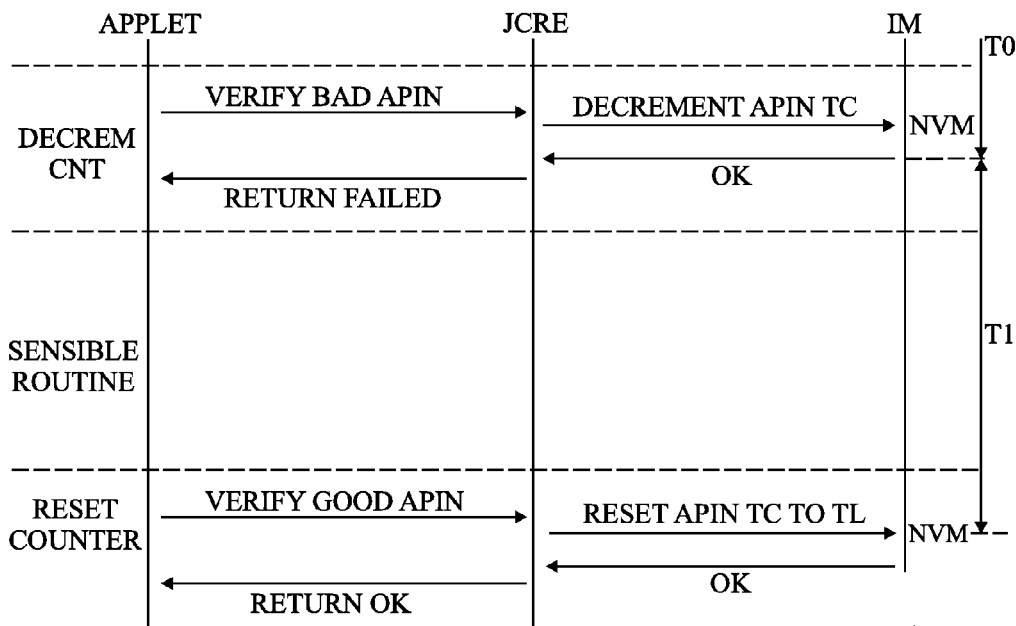
FIG. 6 very schematically illustrates the exchanges, between the runtime environment of the JavaCard application and the internal memory of the microcontroller, in the embodiment of FIG. 5.

FIG. 6 is a simplified representation illustrating the functional exchanges between the JavaCard environment and the internal memory of the circuit by implementing the counter decrement and reset functions as illustrated in FIG. 5.

The implementation of the present invention takes advantage from the existence, in the JavaCard environment, of a specific atomic API. It is the instruction or interface of verification of an identification code of the user (OWNER PIN). The characteristics of the JavaCard program provide for the counter for verifying the number of captures of a user code to be updated in the non-volatile memory for each try.

It is provided to use this code to count the number of executions of the transaction to be monitored without, however, requiring the keying in of a code by the user. To achieve this, a code APIN of the size corresponding to a usual user code is defined in the circuit, for example, in the non-volatile memory. Two values of this code are stored in the non-volatile memory: a correct value GOOD and an erroneous value BAD.

Code APIN is created by a specific JavaCard instruction (instruction Create or "Constructor") in which the code length and the number of possible trials are specified. This number of trials corresponds to the counter reset value. Correct value GOOD is assigned to the code by means of another specific instruction (UPDATE) of the JavaCard language. The code length is of little significance since it is diverted from its current use and is not used to authenticate a user.

At the beginning of the process, to decrement the counter, the JavaCard application (APPLET) contains an instruction to verify the PIN code based on the erroneous code (VERIFY BAD PIN). This instruction, processed by runtime environment JCRE, causes, as usual for the user code verification instruction and as will be seen hereafter in relation with the next drawings, a decrement of try counter TC (DECREMENT APIN TC). The counter decrement is, in accordance with the characteristics of the JavaCard language for this type of transaction, directly written into non-volatile memory NVM of the internal memory. Once the decrement has been performed, the microcontroller returns a signal (OK) notifying the counter decrement to environment JCRE. Although this is of no importance of the executed JavaCard application, environment JCRE returns a message signifying the failure of the authentication (RETURN FAILED).

In the example of FIG. 5, once the monitored transaction SENSIBLE ROUTINE has been executed, at the end of the process, the application contains a counter reset instruction. This instruction includes (FIG. 6) an instruction for verifying the user code based on the correct value (VERIFY GOOD PIN). As will be seen hereafter in relation with FIG. 8, from the time when the correct user code is presented, instruction VERIFY PIN generates a reset (RESET APIN TC TO TL) of try counter TC to a limiting value TL (Try Limit) and an immediate storage of this value in the non-volatile memory. The acknowledgement (OK) returned by the microcontroller then is a message signifying the success of the authentication (RETURN OK). This message, like the counter decrement instruction return message, is not used by the application. However, it being instruction VERIFY PIN, an exception mechanism specific to the JavaCard language is then triggered.

In case of an interrupt in the process during period T1 between the two writings of the counter value into the non-volatile memory, the atomicity recovery mechanism will cause a return to the decremented counter value, set at the end of period T0. An interrupt before the update of the counter decrement will not change its value. An interrupt after its reset will return limiting value TL.

Figure 7:
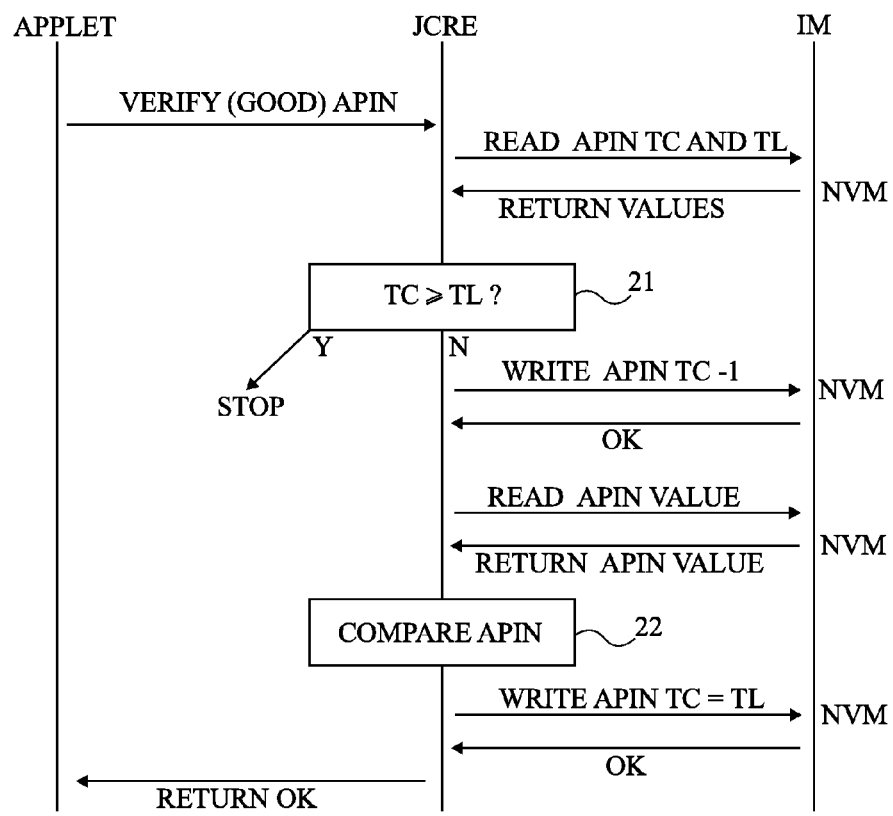
FIG. 7 details the exchanges, between the runtime environment of the JavaCard application and the microcontroller memory, in a step of the method of FIG. 5.

FIG. 7 illustrates steps of the counter reset instruction. Instruction VERIFY PIN, with the correct code transmitted by the application to the runtime environment, translates, in JavaCard language, as a reading (READ APIN TC AND TL) of current value TC of the counter and of its limiting value TL. These values, stored in the non-volatile memory, are returned to the microprocessor. A comparison step 21 (TC≥TL?) verifies that try number TC does not exceed threshold TL. If the maximum number of tries is reached, the microcontroller stops the processing (STOP) without even comparing the identifier, and the application decides what to do next. If, however, the limiting number is not reached, the microcontroller decrements the try counter APIN TC in the non-volatile memory (WRITE APIN TC-1). On reception of an acknowledgement (OK) of this decrement, the microcontroller causes the reading (READ APIN VALUE) of the code value stored in the non-volatile memory. This value is returned thereto (RETURN APIN VALUE). Then, the microcontroller compares (block 22, COMPARE APIN) the stored value with the value sent by the application. Assuming, as in the case of FIG. 7, that the code sent by the application is the correct one, the microcontroller then causes the reset (WRITE APIN TC=TL) of the try counter to its limiting value and its immediate writing into the non-volatile memory. When the writing has actually been performed into the memory, the microcontroller sends back an end-of-instruction message (RETURN OK) to the application.

Figure 8:
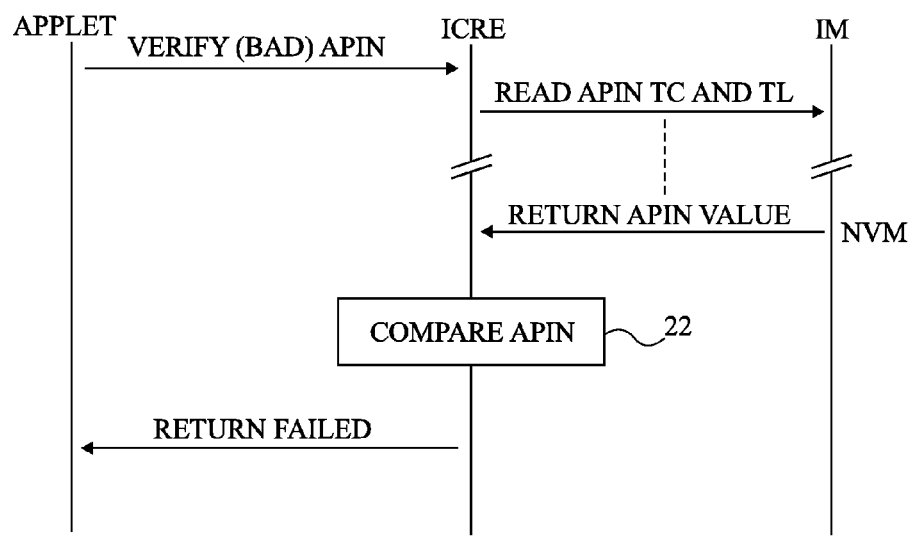
FIG. 8 details these exchanges in another step of verification of the embodiment of FIG. 5.

FIG. 8 illustrates the counter decrement instruction. The limiting number of tries is assumed not to be reached. The sending of instruction VERIFY (BAD) PIN with the erroneous (BAD) code translates as an operation identical to that of FIG. 7 until the returning (RETURN APIN VALUE), by the non-volatile memory, of the value of the stored PIN code. However, comparison step 22 shows a lack of identity between the codes. The try counter is then not reset and the microcontroller returns a failure message (RETURN FAILED) to the application.

The implementation of this counter in a JavaCard application is particularly simple. When the counter should be reset, it is sufficient to send the instruction with the correct user code. However, when the counter should be reliably decremented, it is sufficient to send the wrong instruction. The number of decrement and reset instructions will depend on the application.

For example, to implement a counter of number of uses of data or of the number of executions of a JavaCard application, the counter may be reset on installation of the application, after which no subsequent reset will be provided. The application will thus stop operating once the number of executions has been achieved.

Such a counter may also be used to control the correct execution of an application or of a portion thereof. This especially enables detecting possible fault injection aimed at diverting part of the program, that is, at preventing the execution of some instructions. For example, at the beginning of a monitored section or at several locations in the section, the verification instruction is sent with the erroneous code. The counter is then decremented. At the end of the monitored section, the content of the counter is compared. If it is at the maximum value, this means that at least part of the section (that containing the counter decrement) has not been executed. If the counter is at a correct value (maximum value minus the number of normally provided decrement instructions), it is reset to its maximum value. If the counter is at another value than the expected value, this means that at least part of the monitored section has not been executed.

The implementation of the counter does not adversely affect the execution speed of the application since it does not require making all data writings associated with the application atomic.

However, the use of an object of OWNER PIN class results in that the counter is directly updated in the non-volatile memory, even if the sequence is integrated in a transaction of different atomicity. Accordingly, in the case where the initial state of a transaction is recovered, the other data will recover their respective initial states, but the counter will remain at its modified value. Accordingly, its result remains reliable.

Further, the implementation of this counter is compatible with chip cards and other existing electronic circuits adapted to the JavaCard language. Indeed, such circuits then have the VERIFY PIN instruction and the implementation of the present invention does not modify this instruction.

Various embodiments have been described. Various alterations and modifications will occur to those skilled in the art. In particular, the selection of the values to be given to the correct and erroneous codes is arbitrary, provided to respect the size of the user code accepted by instruction VERIFY PIN of the JavaCard language. Further, the practical implementation of the present invention based on the functional indications given hereabove is within the abilities of those skilled in the art.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for implementing and using a counter to monitor execution of at least a portion of a JavaCard program in a microcontroller adapted to the JavaCard language, the method comprising:
   accessing a correct code value and an erroneous code value stored in a non-volatile memory of the microcontroller; and
   each time the at least a portion of the JavaCard program being monitored is executed, issuing a user code verification instruction with the erroneous code value included as a parameter of the user code verification instruction, the user code verification instruction being configured to cause the microcontroller to:
   compare the parameter of the user code verification instruction with the correct code value stored in the non-volatile memory, and
   decrement a value of the counter in response to the parameter not being the correct code value.

2. The method of claim 1, wherein the decrementing of the value of said counter is atomic.

3. The method of claim 1, wherein the user code verification instruction is issued with the erroneous code value each time the JavaCard program is executed, to count a number of executions of the program written in the JavaCard language using the counter.

4. The method of claim 1, wherein the user code verification instruction is issued with the erroneous code value each time a JavaCard object is used, to count a number of uses of the JavaCard object using the counter.

5. The method of claim 1, further comprising:
   monitoring a flow of execution of a section of the program by issuing the user code verification instruction with the erroneous code value at least once at a beginning of the execution of the section;
   comparing the value of the counter at an end of the execution of the section with a maximum reset value to determine whether the section executed correctly; and
   only in response to determining that the section executed correctly, issuing the user code verification instruction with the correct code value included as the parameter, wherein the user code verification instruction is configured to cause the microcontroller to reset the counter in response to the parameter being the correct code value.

6. An electronic system capable of executing programs in the JavaCard language, comprising at least one rewritable non-volatile memory and at least one volatile memory, and configured to perform an update of a transaction counter according to the method of claim 1.

7. The method of claim 1, wherein the correct and erroneous codes values are generated using the JavaCard language.

8. A device comprising:
a microcontroller adapted to the JavaCard language and configured to implement a counter to monitor execution of at least a portion of a JavaCard program by:
accessing a correct code value and an erroneous code value stored in a non-volatile memory of the microcontroller; and
each time the at least a portion of the JavaCard program being monitored is executed, executing a user code verification instruction with the erroneous code value included as a parameter of the user code verification instruction, the user code verification instruction being configured to cause the microcontroller to:
compare the parameter of the user code verification instruction with the correct code value stored in the non-volatile memory, and
decrement a value of the counter in response to the parameter not being the correct code value.

9. The device of claim 8, wherein the decrementing of the value of the counter is atomic.

10. The device of claim 8, wherein the microcontroller is configured to executed the user code verification instruction with the erroneous code value each time the JavaCard program is executed, to count a number of executions of the program written in the JavaCard language using the counter.

11. The device of claim 8, wherein the microcontroller is configured to execute the user code verification instruction with the erroneous code value each time a JavaCard object is used, to count a number of uses of the JavaCard object using the counter.

12. The device of claim 8, wherein the microcontroller is further configured to:
monitor a flow of execution of a section of the program using the counter by:
executing the user code verification instruction with the erroneous code value at least once at a beginning of the execution of the section;
comparing the value of the counter at an end of the execution of the section with a maximum reset value to determine whether the section executed correctly; and
only in response to determining that the section executed correctly, executing the user code verification instruction with the correct code value included as the parameter, wherein the user code verification instruction is configured to cause the microcontroller to reset the counter in response to the parameter being the correct code value.

13. The device of claim 12, wherein the microcontroller is further configured to determine that at least part of the section has not been executed when the comparing indicates that the value of the counter equals the maximum reset value.

14. A system comprising:
a microcontroller adapted to the JavaCard language and configured to implement a counter to monitor execution of at least a portion of a JavaCard program by:
accessing a correct code value and an erroneous code value stored in a non-volatile memory of the microcontroller; and
each time the at least a portion of the JavaCard program being monitored is executed, executing a user code verification instruction with the erroneous code value included as a parameter of the user code verification instruction, the user code verification instruction being configured to cause the microcontroller to:
compare the parameter of the user code verification instruction with the correct code value stored in the non-volatile memory, and
decrement a value of the counter in response to the parameter not being the correct code value.

15. The system of claim 14, wherein the decrementing of the value of the counter is atomic.

16. The system of claim 14, wherein the microcontroller is configured to executed the user code verification instruction with the erroneous code value each time the JavaCard program is executed, to count a number of executions of the program written in the JavaCard language using the counter.

17. The system of claim 14, wherein the microcontroller is configured to execute the user code verification instruction with the erroneous code value each time a JavaCard object is used, to count a number of uses of the JavaCard object using the counter.

18. The system of claim 14, wherein the microcontroller is further configured to:
monitor a flow of execution of a section of the program using the counter by:
executing the user code verification instruction with the erroneous code value at least once at a beginning of the execution of the section;
comparing the value of the counter at an end of the execution of the section with a maximum reset value to determine whether the section executed correctly; and
only in response to determining that the section executed correctly, executing the user code verification instruction with the correct code value included as the parameter, wherein the user code verification instruction is configured to cause the microcontroller to reset the counter in response to the parameter being the correct code value.

* * * * *